United States Patent
Schroetel et al.

(10) Patent No.: US 10,664,479 B2
(45) Date of Patent: May 26, 2020

(54) ACCOMMODATING CONCURRENT CHANGES IN UNDERLYING DATA DURING REPORTING

(71) Applicants: Sebastian Schroetel, Heidelberg (DE); Stefan Dipper, Wiesloch (DE); Stefan Unnebrink, Neckargemuend (DE); Dirk Janning, Nussloch (DE)

(72) Inventors: Sebastian Schroetel, Heidelberg (DE); Stefan Dipper, Wiesloch (DE); Stefan Unnebrink, Neckargemuend (DE); Dirk Janning, Nussloch (DE)

(73) Assignee: SAP SE, Walldorf (DE)

( * ) Notice: Subject to any disclaimer, the term of this patent is extended or adjusted under 35 U.S.C. 154(b) by 844 days.

(21) Appl. No.: 14/318,103

(22) Filed: Jun. 27, 2014

(65) Prior Publication Data
US 2015/0379059 A1 Dec. 31, 2015

(51) Int. Cl.
*G06F 16/24* (2019.01)
*G06F 16/2457* (2019.01)
*G06F 16/23* (2019.01)
*G06F 16/25* (2019.01)

(52) U.S. Cl.
CPC ...... *G06F 16/2457* (2019.01); *G06F 16/2358* (2019.01)

(58) Field of Classification Search
None
See application file for complete search history.

(56) References Cited

U.S. PATENT DOCUMENTS

| | | | |
|---|---|---|---|
| 6,285,997 B1* | 9/2001 | Carey | G06F 17/30457 |
| 6,510,458 B1* | 1/2003 | Berstis | G06F 17/30902 |
| | | | 707/999.01 |
| 7,263,520 B2 | 8/2007 | Biedenstein et al. | |
| 7,356,524 B2 | 4/2008 | Zurek et al. | |
| 7,593,957 B2 | 9/2009 | Biedenstein et al. | |
| 7,620,642 B2 | 11/2009 | Zurek et al. | |
| 7,650,326 B2 | 1/2010 | Biedenstein et al. | |
| 7,668,803 B2 | 2/2010 | Zurek et al. | |
| 7,720,803 B2 | 5/2010 | Unnebrink et al. | |
| 7,739,285 B2 | 6/2010 | Faerber et al. | |
| 7,865,780 B2 | 1/2011 | Dipper et al. | |
| 7,996,633 B2 | 8/2011 | Zimmerer et al. | |
| 8,032,520 B2 | 10/2011 | Dipper et al. | |
| 8,073,834 B2 | 12/2011 | Faerber et al. | |
| 8,161,070 B2 | 4/2012 | Dipper | |

(Continued)

OTHER PUBLICATIONS

U.S. Appl. No. 14/152,122, filed Jan. 10, 2014, Schroetel et al.

*Primary Examiner* — Usmaan Saeed
*Assistant Examiner* — Yu Zhao
(74) *Attorney, Agent, or Firm* — Fish & Richardson P.C.

(57) ABSTRACT

Methods, systems, and computer-readable storage media for receiving user input indicating a value of a first setting of one or more settings, the first setting defining a data integrity scenario that is be applied during a query session with a database system, the data integrity scenario defining data sources for reading data in response to one or more navigation requests, if a concurrent change occurs in the database system, receiving a query, reading, data from one or more data sources based on the query and the first setting, selectively caching at least a portion of the data based on the first setting, and providing a result for display to a user that submitted the query.

20 Claims, 4 Drawing Sheets

(56) References Cited

U.S. PATENT DOCUMENTS

| | | | |
|---|---|---|---|
| 8,650,181 B2 | 2/2014 | Dipper et al. | |
| 8,655,923 B2 | 2/2014 | Zurek et al. | |
| 8,666,968 B2 | 3/2014 | Sachs et al. | |
| 2003/0185250 A1 | 10/2003 | Harberts et al. | |
| 2004/0193576 A1* | 9/2004 | Petculescu | G06F 17/30592 |
| 2005/0015619 A1* | 1/2005 | Lee | G06Q 10/10 |
| | | | 726/4 |
| 2005/0036381 A1* | 2/2005 | Hassner | G06F 11/1076 |
| | | | 365/222 |
| 2005/0091346 A1* | 4/2005 | Krishnaswami | G06F 9/44505 |
| | | | 709/220 |
| 2005/0165777 A1* | 7/2005 | Hurst-Hiller | G06F 17/30545 |
| 2005/0192941 A1 | 9/2005 | Biedenstein et al. | |
| 2005/0192942 A1 | 9/2005 | Biedenstein et al. | |
| 2009/0100004 A1* | 4/2009 | Andrei | G06F 17/30424 |
| 2012/0185758 A1* | 7/2012 | Huang | G09G 5/14 |
| | | | 715/205 |
| 2013/0318030 A1 | 11/2013 | Nagel et al. | |
| 2014/0108331 A1 | 4/2014 | Dipper | |

* cited by examiner

ACCOMMODATING CONCURRENT CHANGES IN UNDERLYING DATA DURING REPORTING

BACKGROUND

Database systems can be provided to store data and can support reporting, analysis and interpretation of data. For example, a user can query a database and can receive results. In some examples, the results can include data that is responsive to the query and/or a data visualization that is provided based on data that is responsive to the query. In some examples, a database system can provide flexible reporting and analysis tools to support users in evaluating and interpreting data. In some examples, users are able to make informed decisions and determine target-orientated activities to achieve goals based on information provided from a database system.

SUMMARY

Implementations of the present disclosure include computer-implemented methods for providing user-defined read and cache behavior for database systems. In some implementations, methods include actions of receiving user input indicating a value of a first setting of one or more settings, the first setting defining a data integrity scenario that is be applied during a query session with a database system, the data integrity scenario defining data sources for reading data in response to one or more navigation requests, if a concurrent change occurs in the database system, receiving a query, reading, data from one or more data sources based on the query and the first setting, selectively caching at least a portion of the data based on the first setting, and providing a result for display to a user that submitted the query.

These and other implementations can each optionally include one or more of the following features: the value of the first setting includes one of guaranteed stable data from query start, stable data from query start, data source specific data, consistent current data, most current data, and dirty data; actions further include receiving user input indicating a value of a second setting of the one or more settings, the second setting defining a cache usage mode that defines selective use of cache entries for responding to the query and that is to be applied during the query session, wherein selectively caching at least a portion of the data is further based on the second setting; the value of the second setting includes one of always display data from query start, always display current data, and data from query start if possible, otherwise current data; the value of the first setting automatically defines respective values of one or more other settings; other settings include one or more of a cache usage mode, a cache mode and a read mode, wherein a value of at least one of the one or more settings is automatically determined based on the value of the first setting; and the one or more navigation requests are received after a query start and include at least one of a drill-down request and a filtering request.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to providing user-defined read and cache behavior for database systems. More particularly, implementations of the present disclosure enable user-defined data read and cache behavior to be applied during a query session (e.g., between query open and query close events). In some implementations, one or more settings are provided that enable a user to define the read behavior and the cache behavior. In some examples, a first setting enables the user to select a data integrity scenario. In some examples, a plurality of data integrity scenarios are provided and define data sources, from which data is to be read, and/or values of one or more other settings. In some examples, a second setting enables the user to select an extent to which cache is to be used as a data source, if at all, and/or when data is to be newly read from the data base. In some examples, one or more additional setting are provided. In some implementations, . . . .

Figure 1:
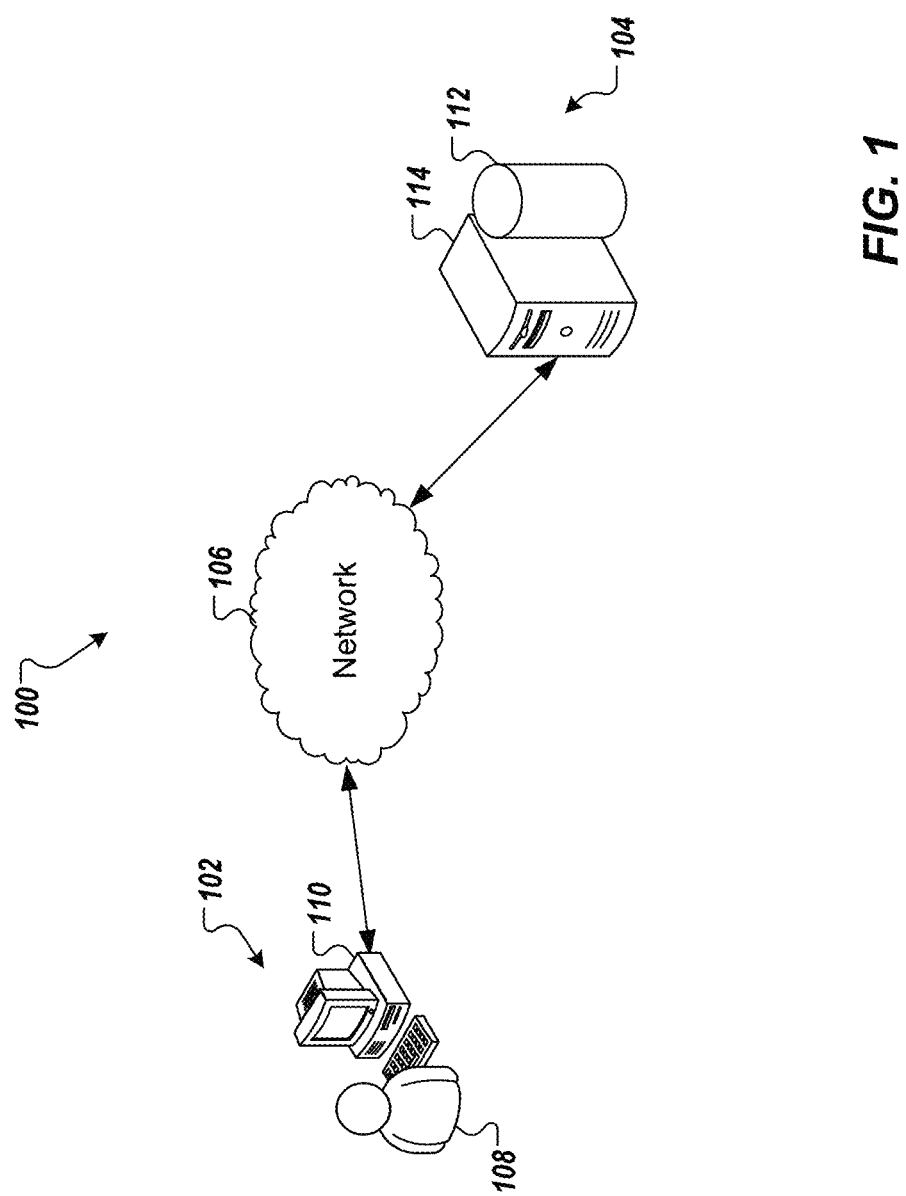
FIG. 1 depicts an example system that can be used to execute implementations of the present disclosure.

FIG. 1 depicts an example system 100 that can be used to execute implementations of the present disclosure. The example system 100 includes a user workstation 102, a server system 104 and a network 106. In the depicted example, a user 108 interacts with the user workstation 102. In an example context, the user 108 can include a data analyst of a company or a department of a company (e.g., warehouse).

In the depicted example, the user workstation 102 includes a computing device 110. In some examples, the computing device 110 can communicate with the server system 104 over the network 106. In some examples, the computing device 110 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes a server 112 and a data store 114. In the example of FIG. 1, the server system 104 is intended to represent various forms of servers including, but not limited to a web server, an application server, a proxy server, a network server, and/or a server pool. In general, the server system 104 accepts user requests for application services and provides such services to any number of client devices (e.g., the computing device 110) over the network 106. In some implementations, the server system 104 can provide a central point through which service-providers can manage and access data related to web services.

In some implementations, the server system 104 provides a database system that stores data and can support reporting, analysis and interpretation of data. For example, a user can query one or more info providers based on data stored in a database and can receive results. In some examples, results can be provided as a report, which can include one or more data visualizations, e.g., tables, graphs, histograms, that can be generated and can be displayed to the user 108 on the computing device 110.

In some implementations, software can be stored in memory of each of the computing devices 110 and/or the server system 104 to provide instructions to a processor (not shown) to perform various functions in accordance with implementations of the present disclosure. Implementations of the present disclosure can also include computer executable instructions, such as program modules executable by a computing device. In some examples, program modules can be defined as routines, programs, objects, components and/or data structures that perform particular tasks.

In accordance with the present disclosure, a user can query a database system for reporting, analysis and/or interpretation of data. For example, a user can establish a user session with the database system, and can submit queries to the database system to retrieve information. In some examples, a report is provided in response to a query based on data stored in a database. A query session is provided between a query open (start) event and a query close (end) event. In some examples, the user can perform one or more navigation steps during the query session. Example navigation steps can include filtering and drilling down data provided in the report. In some examples, data in the database can change between navigation steps. For example, data can be added to the database, data can be deleted from the database, and/or data can be edited within the database. This can be referred to as a concurrent change, and can result in inconsistency between the data displayed in response to a navigation step and data stored in the database. For example, data displayed in response to a navigation step can include data that was retrieved at the query open event, and before a concurrent change occurred in the database.

In some examples, data that is used to provide a report can be provided from a plurality of data sources of the database system. Example data sources include a query object, a cache, and a database. In some examples, a query object is provided as a logical sub-object of a data object that exists during a navigation step. In some examples, data of the query object is stored in memory provided for the user session (e.g., roll memory). In some examples, the query object is an intermediate storage construct that is used to determine a result (e.g., provided in a report).

An example data object can be provided as a data cube, e.g., an online analytical processing (OLAP) data cube. In some examples, a data cube is provided as an array of data categorized into one or more dimensions. For example, a data cube can be a representation of a multi-dimensional spreadsheet, e.g., a multi-dimensional dataset including a plurality of data tables. In some examples, a data cube includes a plurality of cells, where cells are populated with respective values, e.g., number, text. In some examples, each value represents some measure, e.g., of a business, such as sales, revenue, profits, expenses, budget and forecast. In some examples, the query object can be provided as a query cube (also referred to as an info cube), and can be a sub-cube of a data cube. In some example, an info cube is a self-contained dataset, and can include for example, a set of relational tables arranged according to the star schema (e.g., a large fact table surrounded by several dimension tables) In some examples, the info cube is stored in a cache (e.g., local cache, database cache).

In some examples, the cache can include memory that is more quickly readable than the database. Data can be stored in the cache until the data is determined to be invalid (e.g., by some defined condition, end of the user session). In some examples, the cache can be provided in the database system, e.g., in the database. In some examples, the cache can be a local cache provided at a client-side computing device, e.g., the user workstation 102 of FIG. 1.

In some implementations, when data is needed from the database system, the plurality of data sources can be queried in a hierarchical order. For example, it can first be determined whether requested data is available from the query object, then from the cache, and finally from the database. In some examples, data that is displayed in response to a query is provided in the query object. For example, the query object can be populated with data provided in the cache entries and/or data provided from the database. In some examples, if caching is active, the query object can be transformed into cache entries at the end of the navigation step to store the data provided in the query object. In some examples, because the query object vanishes after a navigation step, the query object cannot be used as a data source to fulfill more than one navigation step.

Figure 2:
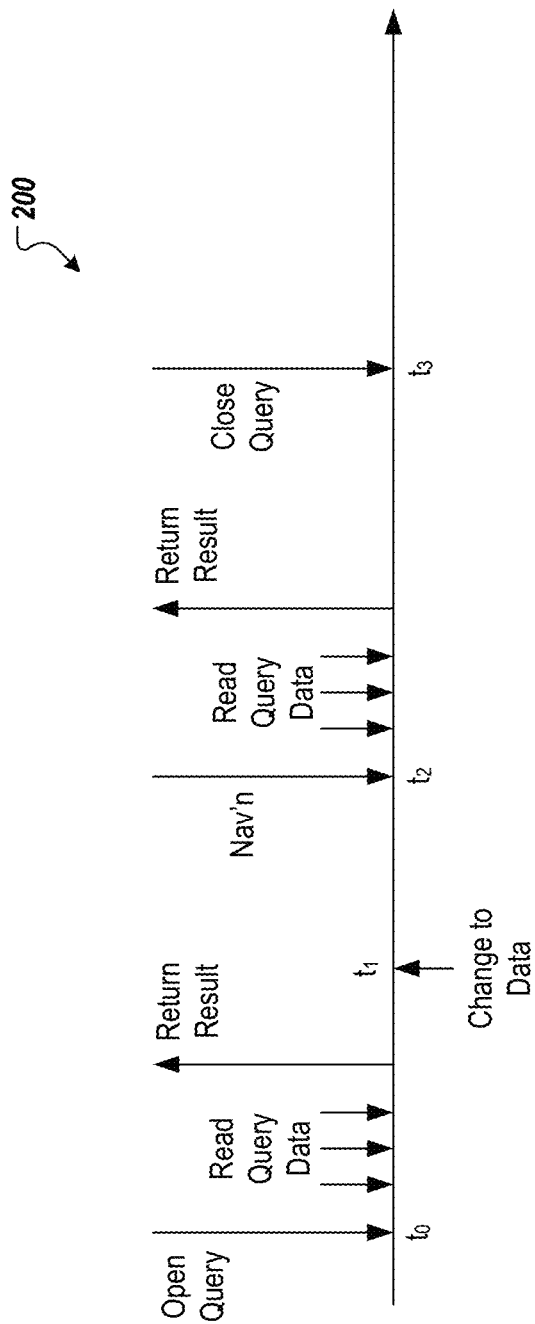
FIG. 2 depicts an example transaction.

FIG. 2 depicts an example transaction 200. In some examples, one or more transactions can occur during a user session. In some examples, a user session begins when a user logs into a database system, and ends when the user logs out of the database system. In some examples, a transaction (query session) is provided between a query being opened and the query being closed. In some examples, the query is opened when the query is submitted to a database system. In some examples, the query is closed when the user indicates that the query is to be closed (e.g., issues a close command). In some examples, data is provided from one or more data sources, also referred to as info providers. Example data sources include a query object (e.g., a query cube, or info cube), a database object (e.g., data cube), a virtual provider, and an operational data provider.

In the example transaction 200 of FIG. 2, a query is opened at time point $t_0$, and data is read from the database in response to the query. For example, the user submits the query from a client-side computing device to a database system. In some examples, a data manager of the database system reads the data from the database to provide an initial result set. In some examples, the data manager is provided as one or more computer-executable programs executed by one or more computing devices. In some examples, the initial result set includes data that is responsive to the query, and is returned to the user. In the example of FIG. 2, a concurrent process performs an operation in the database on data that was provided in the initial result set at time point $t_1$. Example operations can include inserting additional data, modifying data, deleting data. A navigation step occurs at time point $t_2$. An example navigation step includes a drill-down into the data provided in the result. Consequently, a drill-down characteristic is added at time point $t_2$, which requires additional data on top of the data already provided in the initial result set. In the example of FIG. 2, adding a drill-down characteristic results in a data request to provide a revised result set. In the example of FIG. 2, it can be seen how the operation at time point $t_1$ can affect the data displayed to the user in the result after the user navigation step. For example, without again reading data from the database, the result provided in response to the navigation request, would not accurately reflect the data currently in the database.

In accordance with implementations of the present disclosure, query properties are provided that control the read behavior and the cache behavior of the database system. In some examples, the query properties include a plurality of settings, described in further detail herein. In some examples, each setting can have a default value (e.g., provided based on settings provided by respective info provides (the data source(s)). In some examples, values of the settings can be selected by the user. In some implementations, two or more settings are provided that enable the user to define desired read and cache behavior. For example, a graphical user interface (GUI) can be displayed to the user and can include elements, with which the user can interact to provide values for each of the one or more settings. In some examples, the values define the read and cache behavior for a query session.

In some implementations, a first setting enables the user to select a data integrity scenario. In some examples, a plurality of data integrity scenarios are provided and define data sources, from which data is to be read, and/or values of one or more other settings. In some implementations, a second setting enables the user to select an extent to which cache is to be used as a data source, if at all, and/or when data is to be newly read from the data base. In some implementations, a third setting enables the user to select a read mode to define which type of data is read from the database (e.g., through the data manager) or from the cache. In some implementations, a fourth setting enables the user to select a cache mode to define a type of cache that is active, if at all.

In some implementations, a fifth setting enables the user to select a cache validity, to define a time period (e.g., cache delay), after which a cache entry is automatically invalidated. In some implementations, a sixth setting enables the user to select a delta cache value to selectively enable cache entries to be completed by reading delta values from the database. In some implementations, a seventh setting enables the user to select a data integrity, which determines what data of respective info providers is to be read. In some implementations, an eighth setting enables the user to select an info provider grouping/partition mode that defines how many partitions a multiple providers are to be split into when reading data.

In some implementations, direct dependencies and/or transitive dependencies between settings (e.g., cache usage mode, cache mode, read mode and data integrity) are sufficiently complex, such that users are unable to foresee consequences of individual settings. Consequently, and in accordance with implementations of the present disclosure, one or more settings influence one or more other settings. For example, and as described in further detail below, the value of one setting can result in automatic selection of a value of another setting.

As noted above, the first setting enables the user to select a data integrity scenario. Different users may have different needs with respect to data integrity, and thus how concurrent changes are handled during a user session. For example, a user may want the results (e.g., report) to be based on the most up-to-date data during the query session (e.g., between query open and query close), or a user may want the results to be based on data that does not change during the query session. In these examples, the user wants to report either on the most current data that can change during query navigation (and the user wants to see the changed data), or on a fixed data set that does not change during query navigation. In other words, the question is whether the user wants to see concurrent changes during query navigation, which is the requirement from the end-user point of view. The database system, however, has technical restrictions to the user's request. In some examples, the feasibility of achieving the user's request is dependent on the types of info providers, and whether info providers support delta cache reading.

Implementations of the present disclosure enable user-desired read and cache behavior in view of technical restrictions. In some implementations, this is achieved by providing multiple settings and enabling one or more settings to influence one or more other settings. For example, and as described in further detail below, the value of one setting can result in automatic selection of a value of another setting.

In some implementations, the first setting provides a data integrity scenario desired by the user. In some examples, the data integrity scenario provides a simple way for the user to control the data integrity of a query without the need to understand all the expert settings of data integrity, cache mode, read mode, partition mode, and cache usage mode. By using the data integrity scenario, the database system automatically uses correct settings for other settings (e.g., data integrity, cache mode, read mode, partition mode, and cache usage mode). More specifically, and in accordance with implementations of the present disclosure, the data integrity scenario (i.e., the first setting) is a super-setting, where each value provides a respective, pre-defined combination of one of more other settings (e.g., one or more of the second through eighth settings). In some examples, the user can select a desired data integrity scenario by selecting a corresponding value for the first setting, which automatically selects values for one or more other settings, or the user can manually select values of the settings. Automatic selection of settings based on a selected data integrity scenario avoids the potential for contradictory settings, which would not result in the desired query behavior. In some examples, the data integrity scenario allows the user to define the data that is to be displayed assuming a concurrent operation occurs during the query session (e.g., data is added to, deleted from or modified in the database). For example, and as described in further detail herein, the user can indicate whether the most up-to-date data is to be provided (e.g., accounting for any concurrent operation(s) that have occurred since the query start), whether only data from the query start is to be provided (e.g., ignoring any concurrent operation(s) that have occurred since the query start), or whether the most up-to-date data is to be provided, while keeping already calculated data (e.g., calculated data is not to be recalculated, even if underlying data has changed). In some examples, the user can make their selection based on desired performance of the database system. For example, having the most up-to-date data can result in numerous reads back to the database, which can require additional resources, and time for the result. As another example, having only the data from the query start can be achieved using only the cache, without reads back to the database, which reduces resources need, and shortens time for the result.

In some implementations, example values that can be provided for the first setting (data integrity scenario) include: default (DIS_D), guaranteed stable data from query start (DIS_G), data from query start (DIS_S), provider specific (DIS_P), consistent current data (DIS_C), most current data (DIS_M) and dirty data (DIS_D). In some examples, DIS_D indicates that the values of other settings (e.g., the second setting, the third setting, the fourth setting) are to be set independently by the user (e.g., the user can be presumed to be an expert). That is, no data integrity scenario is defined, which influences values of other settings.

In some implementations, DIS_G indicates that all data that is responsive to the query is read from the database when the query is started (e.g., query opened). That is, the query always shows data from query start, and every potential navigation within the query space will work. Consequently, DIS_G provides stable data, but poorer performance (e.g., higher resource consumption, slower response time). In some examples, DIS_G recommended for queries with very view characteristics and limited navigation capabilities. For example, DIS_G can consume a significant amount of resources (relative to other modes), such as application server memory, and the initial response time can be high (relative to other modes). For example, at the query start a snapshot of data from the database is taken, which can consume more memory/computational power and can require more time than other data integrity scenarios. In some examples, selection of DIS_G results in automatic selection of the read mode, as discussed in further detail below. In some examples, planning and/or adding certain navigation characteristics is not possible, if DIS_G is selected. In some examples, if one or more variables that are part of the static query filter are changed, a new snapshot is taken. This can result in resource consumption and additional time, In some implementations, DIS_S provides stable data with appropriate performance (e.g., lower resource consumptions and/or faster response time than provided with DIS_G). In some examples, selection of DIS_S results in automatic selection of the data integrity mode, as discussed in further detail below.

In some implementations, DIS_P provides implicit default behavior for the database system. In some examples, DIS_P provides settings depending on characteristics of respective info providers. For example, data from info providers that offer the ability to read old versions of data are read as provided with DIS_S, and transactional info providers are read with current data. In some examples, and for particular info providers, the data integrity is automatically selected. For some info providers, data is read from the cache where available, otherwise current data is read from the database. In some examples, if an info provider is not able to read old versions of data, the read mode is automatically changed for the particular info provider, as described in further detail below.

In some implementations, DIS_C provides current data each time a new list is calculated, while keeping the data within the list consistent during drill operations. In some examples, the data integrity is automatically set based on info provider type, as described in further detail herein. For example, info cubes are read based on a setting, and are read based on another setting. In some examples, if an info provider is not able to read old versions of data, the read mode is automatically changed for the particular info provider, as described in further detail below.

In some implementations, DIS_M always displays new data and does not keep the consistency within a displayed list during drill operations. In some examples, the data integrity is automatically set based on info provider type, as described in further detail herein.

In some implementations, DIS_D provide the same behavior as DIS_M, except that the cache provided in the analytic engine is inactive. Consequently, the response time can be relatively high. In some examples, info providers that offer the ability to read old versions of data are all providers that are able to make use of the delta cache.

In some implementations, the second setting provides a cache usage mode desired by the user and/or required by another setting (e.g., the data integrity scenario).

In some examples, the cache usage mode is an extension to the cache mode (the fourth setting). In some examples, the cache usage mode defines situations, in which cache entries can be used for answering a query, and in which data is to be read anew (e.g., from the database).

In some implementations, example values that can be provided for the second setting (cache usage mode) include: stable data (CU_S), current data (CU_C), and default (CU_D). In some examples, CU_S indicates that data is always to be displayed from query start. For example, the time of the query start determines the status of the data. In some examples, when the user navigates (e.g., drills down) inside the query, data is always displayed in the status like it was at the beginning of the query. In some examples, CU_C indicates that current data is always to be displayed. For example, for each navigation step in the query session, data is freshly read. In some examples, this does not necessarily require new read operations, if, for example, the database system knows that the status of the respective info provider has not changed and data for answering the current query is already available in the cache. However, if the info provider status has changed, data needs to be read anew from the database (e.g., a new read operation). In some examples, CU_D indicates that data from the query start is to be used, if possible, otherwise current data is used. In some examples, for info providers that enable old versions of the data to be read, the time of the query start determines the status of the data. In some examples, info providers that do not enable old versions of the data to be read, deliver new data, if the data cannot be provided from the cache.

The cache usage mode can be described as a compromise between not using the cache at all (e.g., CU_C), and taking a full snapshot of the data (e.g., CU_S), while still considering query performance. The cache usage mode leverages the info provider capabilities to provide information about its fill state and to read old versions of data, and still delivers a result set that is self-consistent. In some examples, CU_C enables new data to be read for info providers with a high update frequency. In some examples, a warning can be displayed to the user with CU_S, if an info provider is not capable of delivering an old version of the data and the requested data is not available in the query cache.

In some implementations, the third setting (read mode) enables the user to select a read mode to define which type of data is read from the database (e.g., through the data manager) or from the cache. Example values that can be provided for the third setting (read mode) include: query to read all data at once (RM_A), query to read data during navigation (RM_X), and query to read when navigating or expanding (RM_H). In some examples, RM_A indicates that, when the query is started (e.g., received by the data manager), all data that is responsive to the query is read from the database. In some examples, any dynamic filters that are applied are ignored. In some examples, at any navigation step during query runtime, no new data is read from the database. Instead, all data for navigation steps is stored in the main memory after the initial read from the database. In some examples, RM_X indicates that a new read/cache request is made for each navigation step. For example, changing characteristics and/or filters in a navigation step results in a read/cache request. In some examples, the cache is initially checked to determine whether cache entries can be used for the navigation step. In some examples, if a hierarchy is active all data of all hierarchy levels is read at the same time. In some examples, RM_H indicates that a new read/cache request is made for each navigation step when expanding a hierarchy node. For example, changing characteristics and/or filters and expanding a hierarchy node in a navigation step results in a read/cache request. In some examples, if a hierarchy is active during the navigation step, the data is only read up to the displayed hierarchy levels. In some examples, the cache is initially checked to determine whether cache entries can be used for the navigation step.

In some examples, the read mode setting is automatically selected based on the data integrity scenario. For example, if DIS_G is selected, RM_A is automatically selected. That is, for example, the user cannot change the read mode setting from RM_A. As another example, if DIS_P is selected, RM_H is selected, if info providers are able to read old version of data, and RM_X is selected, if info providers are unable to read old version of data. As another example, if DIS_C is selected, RM_H is selected, if info providers are able to read old version of data, and RM_X is selected, if info providers are unable to read old version of data.

In some implementations, the fourth setting (cache mode) describes the type if cache that is active, if any. Example values for the fourth setting (cache mode) can be provided as: cache in database (CM_D), local cache (CM_0), and cache inactive (CM_I). In some examples, CM_D indicates that data is cached and the cache entries are stored in the database. In some examples, the cache entries can be used by different transactions (e.g., queries submitted by different users). In some examples, validity of the cache entries is monitored (e.g., has the underlying data in the database changed, such that one or more cache entries is no longer valid). In some examples, CM_0 indicates that data is stored in the roll memory of a respective transaction (e.g., query). In some examples, data in the cache is only used for the respective transaction. In some examples, the data is deleted from the cache at the end of the transaction (e.g., query closed).

In some implementations, the fifth setting (cache validity) enables the user to select a cache validity, to define a time period (e.g., cache delay), after which a cache entry is automatically invalidated. Is some examples, this can be helpful for info providers with no timestamp support. The data is cached for the duration that is setup in the cache delay, and setting causes cache entries to become invalid after the specified duration (e.g., in seconds).

In some implementations, the sixth setting (update cache objects in delta process) enables the user to select a delta cache value to selectively enable cache entries to be completed by reading delta values from the database. For example, if new data is added to an info provider and the info provider supports deltas, then the added data can be read separately. In this manner, data that is already cached can be used, and the new data can be read and the cache entries are merged and stored back into the cache.

In some implementations, the seventh setting (data integrity) determines what data of respective info providers is to be read. Example values of the seventh setting can be provided as: all info providers up to released status (DI_0), real-time info cubes up to current version (DI_1), all info providers up to consecutive successfully loaded requests (DI_2), all info providers up to all successfully loaded requests (DI_3), every info provided in a multi-provider context based on respective setting (DI_7), and all info providers completely (DI_9). In some examples, DI_0 indicates that data is read up to rollup. In some examples, rollup is a process, by which data is loaded into aggregate tables, such that the data is available for reporting. Ins some examples, DI_1 indicates that, if the info provider is a real-time info cube, the data for this info provider is read including the open requests (e.g., requests that are still loading), and, if the info provider is any other type of provider, then the data is read up to rollup (e.g., all loaded requests that have been aggregated). In some examples, DI_2 indicates that data of consecutive aggregated requests and loaded requests that have not yet been aggregated is read for all info providers, regardless of type. For example, data of any loaded requests occurring after an unsuccessful request or a request pending loading is not read. In some examples, DI_3 indicates that data of all loaded requests, whether aggregated or not, is read, even if there are unsuccessfully loaded request, or pending requests between loaded requests. In some examples, DI_7 indicates that, if the info provider is a multi-provider (e.g., an info provider including two or more info providers), data from the individual info providers is read with their respecting data integrity mode setting. In some examples, DI_9 indicates that data of all requests is read including loaded requests, pending loading requests, and unsuccessfully loaded requests.

In some examples, the data integrity setting is automatically selected based on the data integrity scenario. For example, if DIS_S is selected, DI_0 is automatically selected. As another example, if DIS_P is selected, DI_1 is automatically selected. As another example, if DIS_C is selected, DI_1 is selected for a first type of info provider (e.g., info cube), and DI_2 is selected for a second type of provider (e.g., transactional provider). As another example, if DIS_M is selected, DI_9 is selected for info cubes (e.g., normal and transactional).

In some implementations, the eighth setting enables the user to select an info provider grouping mode that defines how many partitions a multi-provider is to be split into when reading data. In some examples, a multi-provider includes two or more info providers (e.g., is a composite info provider). Example setting can be provided as: no grouping (IPG_0), grouping based on info provider type (IPG_1), grouping based on info provider type and info cubes separately (IPG_2), and every info provider separately (IPG_3). In some examples, IPG_0 indicates that data from all info providers is read at once. In some examples, any unions/ joins are performed at a lower level (e.g., in the database). In some examples, IPG_1 indicates that all info providers of the same type are put into one partition. That is, partitions are specific to info provider type. In some examples, if all info providers have the same type, only one partition is provided. In some examples, IPG_2 indicates that all info providers of the same type are put into one partition except info cubes. Instead, each info cube is put into a separate partition. In some examples, IPG_3 indicates that each info provider is put into a separate partition.

Figure 3:
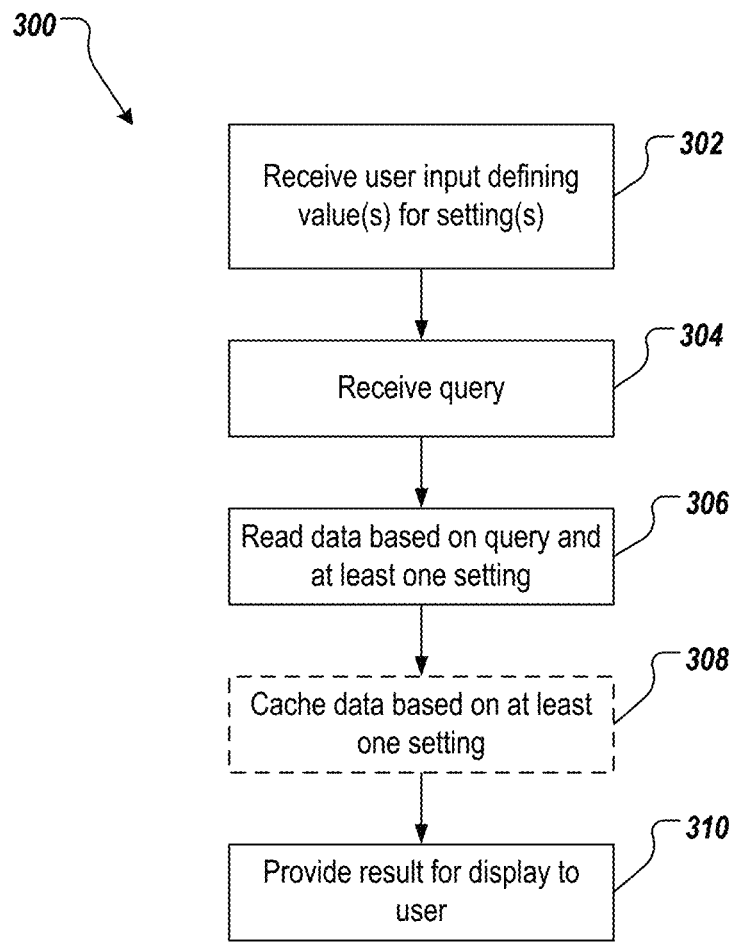
FIG. 3 depicts an example process that can be executed in accordance with implementations of the present disclosure.

FIG. 3 depicts an example process 300 that can be executed in accordance with implementations of the present disclosure. In some examples, the example process 300 can be provided using one or more computer-executable programs executed using one or more computing devices, e.g., the server system 104 of FIG. 1. The example process 300 can be used for providing user-defined read and cache behavior for database systems.

User input defining values of one or more settings is received (402). For example, a GUI can be displayed to a user, through which the user can indicate values of the one or more settings. Example settings include a data integrity scenario, a cache usage mode, a read mode and a cache mode, among others, as described in detail herein. In some examples, a value of a first setting of one or more settings is received, where the first setting defines a data integrity scenario that is be applied during a query session with a database system, the data integrity scenario defining data sources for reading data in response to one or more navigation requests, if a concurrent change occurs in the database system. A query is received (404). For example, the user submits a query to the database system.

Data is read based on the query and at least one setting of the one or more settings (406). For example, the database is read to retrieve data that is responsive to the query and based on the value of the first setting. For example, the value of the first setting can include guaranteed data from query start (DIS_G). Consequently, all data that could be required for any potential navigation request during the query session is read from the database. As an option, data is cached based on at least one setting of the one or more settings (408). For example, if the cache mode is set to cache inactive (CM_I), data is not cached. As another example, if the cache mode is set to cache in database (CM_D) or local cache (CM_0), data is cached based on the at least one setting of the one or more settings. A result is provided for display to the user that submitted the query (410). In some examples, the user can perform one or more navigation steps (e.g., submit navigation requests), which can be performed based on values of the one or more settings to provide user-desired behavior in view of any concurrent changes in the data underlying the result.

Figure 4:
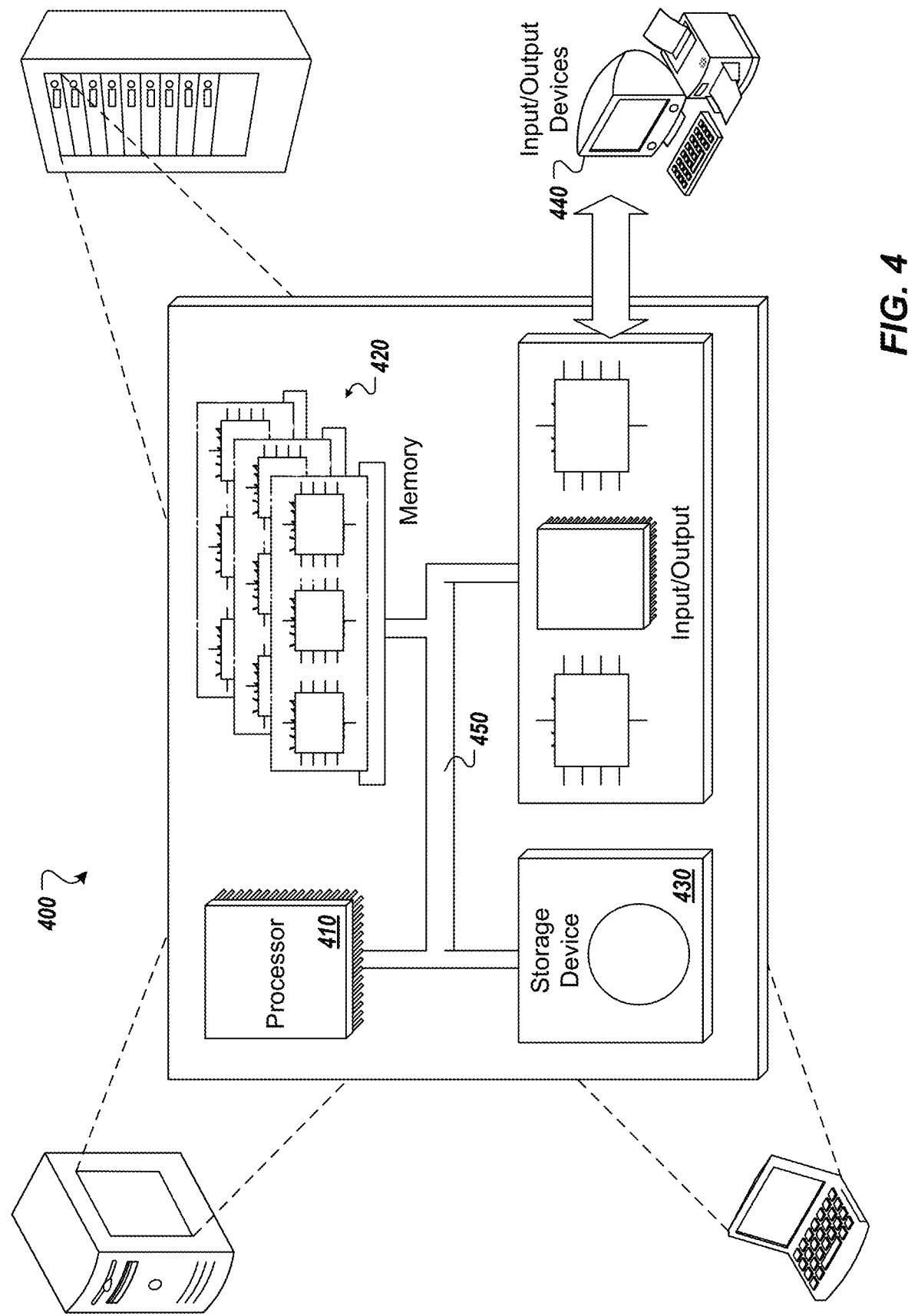
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing user-defined read and cache behavior for database systems, the method being executed using one or more processors and comprising:
receiving, by the one or more processors, user input based on desired performance of a database system and indicating a value of a first setting of one or more settings, where the first setting is a super setting defining a data integrity scenario that is to be applied during a query session with a database system, where each value of the first setting automatically provides a respective, pre-defined combination of two or more settings of the one or more settings other than the first setting, the first setting configured to define direct or transitive dependencies between the two or more settings to prevent contradictory value settings of the two or more settings, the data integrity scenario ensuring accuracy of a database query result between a query open event and a query close event by defining data sources for reading data from the database system following an occurrence of one or more navigation requests and a concurrent change to data in the database system between the one or more navigation requests, and the first setting selected based on computing resource consumption and memory usage of the database system to affect response time of the database system;
receiving, by the one or more processors, a query;
reading, by the one or more processors, data from one or more data sources based on the query and the first setting;
selectively caching, by the one or more processors, at least a portion of the data to a cache based on the first setting; and
providing, by the one or more processors, a result for display to a user that submitted the query.

2. The method of claim 1, wherein the value of the first setting comprises one of guaranteed stable data from query start, stable data from query start, data source specific data, consistent current data, most current data, and dirty data.

3. The method of claim 1, further comprising receiving user input indicating a value of a second setting of the one or more settings, the second setting defining a cache usage mode that defines selective use of cache entries for responding to the query and that is to be applied during the query session, wherein selectively caching at least a portion of the data to the cache is further based on the second setting.

4. The method of claim 3, wherein the value of the second setting comprises one of always display data from query start, always display current data, and data from query start if possible, otherwise current data.

5. The method of claim 1, wherein the value of the first setting automatically defines respective values of settings for data integrity, cache mode, read mode, partition mode, and cache usage mode.

6. The method of claim 1, wherein other settings include one or more of a cache usage mode, a cache mode and a read mode, wherein a value of at least one of the one or more settings is automatically determined based on the value of the first setting.

7. The method of claim 1, wherein the one or more navigation requests are received after a query start and comprise at least one of a drill-down request and a filtering request.

8. A non-transitory computer-readable storage medium coupled to one or more processors and having instructions stored thereon which, when executed by the one or more processors, cause the one or more processors to perform operations for providing user-defined read and cache behavior for database systems, the operations comprising:
receiving, by the one or more processors, user input based on desired performance of a database system and indicating a value of a first setting of one or more settings, where the first setting is a super setting defining a data integrity scenario that is to be applied during a query session with a database system, where each value of the first setting automatically provides a respective, pre-defined combination of two or more settings of the one or more settings other than the first setting, the first setting configured to define direct or transitive dependencies between two or more settings to prevent contradictory value settings of the two or more settings, the data integrity scenario ensuring accuracy of a database query result between a query open event and a query close event by defining data sources for reading data from the database system following an occurrence of one or more navigation requests and a concurrent change to data in the database system between the one or more navigation requests, and the first setting selected based on computing resource consumption and memory usage of the database system to affect response time of the database system;
receiving a query;
reading data from one or more data sources based on the query and the first setting;
selectively caching at least a portion of the data to a cache based on the first setting; and providing a result for display to a user that submitted the query.

9. The non-transitory computer-readable storage medium of claim 8, wherein the value of the first setting comprises one of guaranteed stable data from query start, stable data from query start, data source specific data, consistent current data, most current data, and dirty data.

10. The non-transitory computer-readable storage medium of claim 8, wherein operations further comprise receiving user input indicating a value of a second setting of the one or more settings, the second setting defining a cache usage mode that defines selective use of cache entries for responding to the query and that is to be applied during the query session, wherein selectively caching at least a portion of the data to the cache is further based on the second setting.

11. The non-transitory computer-readable storage medium of claim 10, wherein the value of the second setting comprises one of always display data from query start, always display current data, and data from query start if possible, otherwise current data.

12. The non-transitory computer-readable storage medium of claim 8, wherein the value of the first setting automatically defines respective values of settings for data integrity, cache mode, read mode, partition mode, and cache usage mode.

13. The non-transitory computer-readable storage medium of claim 8, wherein other settings include one or more of a cache usage mode, a cache mode and a read mode, wherein a value of at least one of the one or more settings is automatically determined based on the value of the first setting.

14. The non-transitory computer-readable storage medium of claim 8, wherein the one or more navigation requests are received after a query start and comprise at least one of a drill-down request and a filtering request.

15. A system, comprising:
  a computing device; and
  a computer-readable storage device coupled to the computing device and having instructions stored thereon which, when executed by the computing device, cause the computing device to perform operations for providing user-defined read and cache behavior for database systems, the operations comprising:
    receiving, by the one or more processors, user input based on desired performance of a database system and indicating a value of a first setting of one or more settings, where the first setting is a super setting defining a data integrity scenario that is to be applied during a query session with a database system, where each value of the first setting automatically provides a respective, pre-defined combination of two or more settings of the one or more settings other than the first setting, the first setting configured to define direct or transitive dependencies between the two or more settings to prevent contradictory value settings of the two or more settings, the data integrity scenario ensuring accuracy of a database query result between a query open event and a query close event by defining data sources for reading data from the database system following an occurrence of one or more navigation requests and a concurrent change to data in the database system between the one or more navigation requests, and the first setting selected based on computing resource consumption and memory usage of the database system to affect response time of the database system;
    receiving a query;
    reading data from one or more data sources based on the query and the first setting;
    selectively caching at least a portion of the data to a cache based on the first setting; and
    providing a result for display to a user that submitted the query.

16. The system of claim 15, wherein the value of the first setting comprises one of guaranteed stable data from query start, stable data from query start, data source specific data, consistent current data, most current data, and dirty data.

17. The system of claim 15, wherein operations further comprise receiving user input indicating a value of a second setting of the one or more settings, the second setting defining a cache usage mode that defines selective use of cache entries for responding to the query and that is to be applied during the query session, wherein selectively caching at least a portion of the data to the cache is further based on the second setting.

18. The system of claim 17, wherein the value of the second setting comprises one of always display data from query start, always display current data, and data from query start if possible, otherwise current data.

19. The system of claim 15, wherein the value of the first setting automatically defines respective values of settings for data integrity, cache mode, read mode, partition mode, and cache usage mode.

20. The system of claim 15, wherein other settings include one or more of a cache usage mode, a cache mode and a read mode, wherein a value of at least one of the one or more settings is automatically determined based on the value of the first setting.

* * * * *